United States Patent Office 3,243,281
Patented Mar. 29, 1966

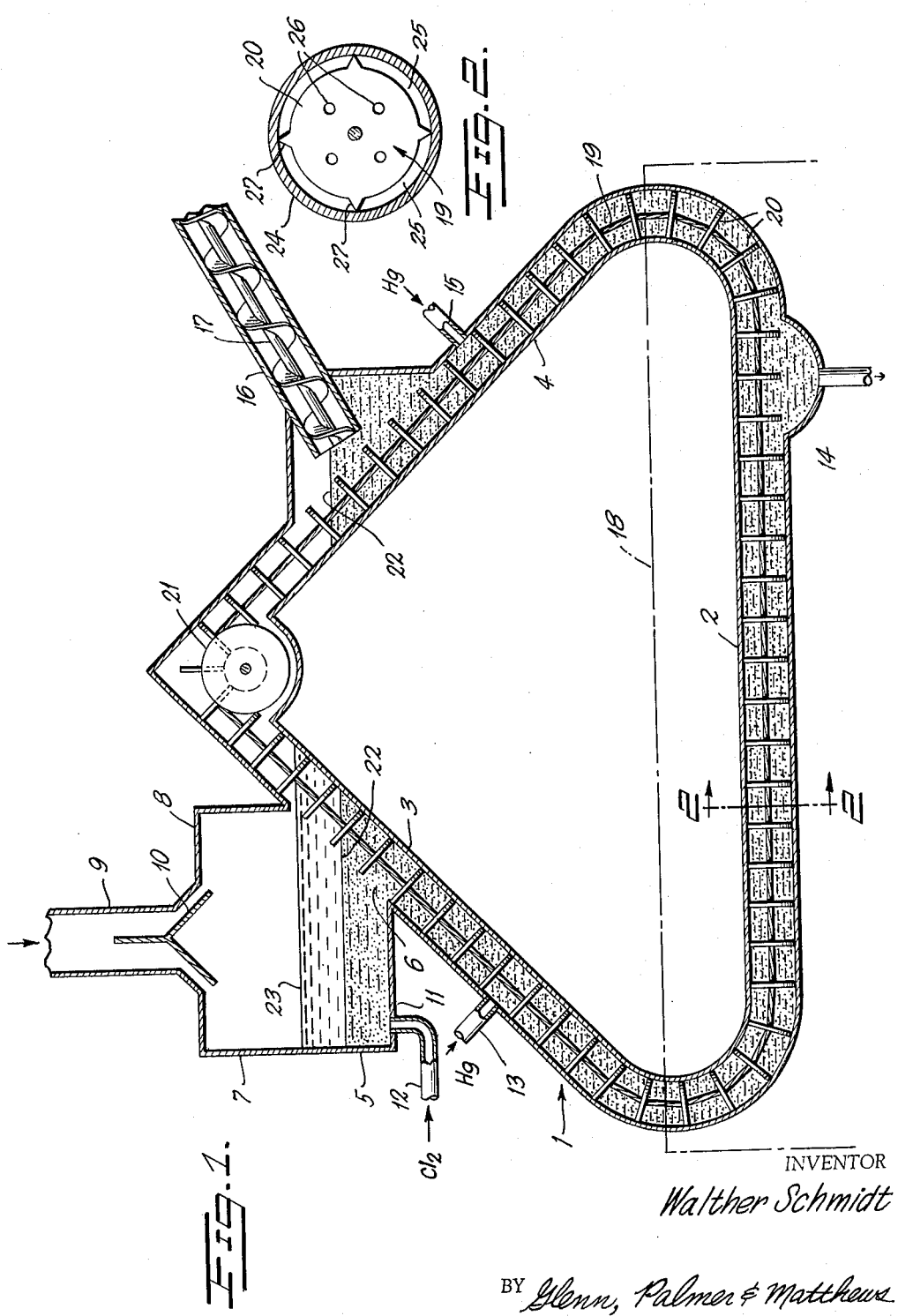

3,243,281
EXTRACTION OF ALUMINUM USING MERCURY CONTAINING MERCURIC HALIDE
Walther Schmidt, Richmond, Va., assignor to Reynolds Metals Company, Richmond, Va., a corporation of Delaware
Filed Apr. 3, 1962, Ser. No. 184,814
22 Claims. (Cl. 75—68)

This invention relates to a novel process and apparatus for the mercury extraction of aluminum from alloys with other metals, mixed scrap, drosses, waste, crude alloys with silicon, and the like. More particularly, the invention concerns the extraction of metallic aluminum from materials containing the same, by leaching with liquid mercury, the dissolution of the aluminum in the mercury being promoted by prior treatment with a novel activating composition.

The extraction of aluminum from materials in which it is available in metallic form by means of hot liquid extracting metals such as mercury or zinc, has been frequently proposed in the prior art. It has been the objective of these known methods to employ relatively limited amounts of the extracting metal, forming an amalgam with the aluminum, separating the amalgam from undissolved residues, recovering the aluminum from the amalgam by distillation or other suitable means, and recycling the extracting metal for further use. Thus, aluminum can be separated from iron, silicon, titanium and copper, which are substantially insoluble in liquid mercury at elevated temperatures.

In one known method, leaching of aluminum scrap is performed by passing the scrap through a slightly inclined heated sealed tube by means of a screw conveyor, in contact with liquid mercury at a temperature of about 550° C. under a pressure of about 15 atmospheres (B. Pt. of Hg is 356.9° C. at 1 atm.), the pressure being provided by a pair of vertical tubes of different length, each connecting with the heating tube. The scrap is fed into the lower end of the heating tube and moves countercurrent to a stream of mercury, which is circulated from the longer tube connected to the lower end of the heating tube, across to the upper end of the shorter tube and down to the upper end of the heating tube, to provide countercurrent flow.

In another known form of apparatus, an aluminum alloy in crushed solid form is placed in perforated trays of a bucket elevator vertically disposed in an extraction furnace, a spray of liquid extracting metal, such as zinc, at elevated temperature passing downward through the alloy pieces and being collected with its dissolved aluminum at the bottom of the furnace. In still another form of extraction apparatus, an aluminum alloy is extracted with a liquid metal such as zinc under high vacuum in a vertically disposed leaching pot.

These prior art methods have possessed several disadvantages, among which are the necessity of mechanically preconditioning the aluminum alloy by crushing or rolling in order to improve the ability of the aluminum to dissolve in the mercury, the use of high pressure or high vacuum, and the need to maintain large volumes of costly mercury in circulation within the system for effective extraction. Thus there has existed a need for an efficient and economical method for extracting or leaching of aluminum metal with mercury, particularly from scrap or waste products containing the aluminum.

In accordance with the present invention, there are provided a novel process and apparatus for the extraction of metallic aluminum from materials containing the same which represent a notable advance in this field of technology.

The invention has for its principal object the extraction of metallic aluminum from alloys and composites containing the same employing as the extracting agent, liquid mercury, or a liquid amalgam of mercury with lead, zinc, magnesium, or sodium, said extraction being carried out at a temperature substantially above the boiling point of mercury or of the amalgam.

A further object of the invention is the provision of a process of chemically preconditioning or activating the surface of the metallic aluminum to be extracted, thereby promoting rapid dissolution of the aluminum in the mercury or amalgam.

Still another object of the invention is to provide novel apparatus for effectively carrying out the extraction process under moderate conditions and with economy of materials.

These and other objects which will become apparent as the description proceeds are accomplished by the invention as set forth in the specifications and accompanying drawing, in which:

FIG. 1 is a sectional elevation of one form of apparatus for carrying out the process of the invention.

FIG. 2 is a sectional view taken along the line A—A' of FIG. 1, showing the configuration of the flights of the conveyer system depicted in FIG. 1.

The aluminum metal containing alloys, scrap, dross, wastes, and other composites which are adapted to be treated in accordance with the novel processes of the invention include mixtures in which the amount of aluminum metal present may range from a few percent up to metal or alloys of relatively high purity. The process of the invention is particularly suited to the extraction of aluminum metal from alloys of aluminum and silicon of the type obtainable by the carbothermic reduction of bauxite or aluminous clays with carbon (coke), which are sometimes called crude alloys. Such alloys will generally contain from about 40 to 75 percent of aluminum, the balance being silicon, with small amounts of iron and titanium. An alloy of aluminum and silicon which is especially adapted for treatment according to the invention is the reduction alloy of aluminum and silicon containing about 60% Al and about 35% Si, with small percentages of Fe and Ti, and this alloy will serve to illustrate the invention, but it is to be understood that this selection is not to be considered as limiting. Another suitable alloy is the eutectic of aluminum and silicon, containing about 12–13% Si, which is obtainable by melting the aforementioned alloy, allowing the melt to cool and separating the liquid eutectic from the solidified components, by filtration or other means.

The alloy, dross, waste, or the like to be subjected to extraction is first comminuted to a suitable particle size so that it will be readily handled by the conveying system of the extraction apparatus. The particle size is not critical, and may range, for example, from about 2 to 10 mm. in diameter. Lump diameters of about ¼" have been found advantageous.

Aluminum in its ordinary metallic state is not readily wetted by liquid mercury. The difficulty arises from the presence of a tenacious aluminum oxide film which is not penetrated by the mercury except at random spots where the film may be thin enough or ruptured. While aluminum can be readily dissolved in mercury at elevated temperatures, as indicated by the known Al-Hg phase diagram, it takes an extremely long time until ordinary aluminum is dissolved. The reason is the lack of sufficient points of weakness or rupture at which the mercury can attack the aluminum. This, the solubility of aluminum in mercury, in percent by weight is about 1.5% at 500° C., 2% at about 520° C., 4% at 550° C., rising very gradually thereafter to about 10% at about 575° C.

As mentioned previously, mechanical means have been proposed for deforming the pieces of alloy to be extracted in order to improve solubility of the aluminum, such as disclosed, for example, in U.S. Patent 2,676,358. These proposals involve complicated auxiliary grinding or rolling equipment and attendant control devices.

In accordance with one aspect of the present invention, there is provided a chemical method for the conditioning or activation of the aluminum metal surfaces, thereby promoting wetting by and rapid dissolution in the mercury or mercury amalgam.

It is known that aluminum metal surfaces can be activated, i.e. the aluminum oxide films can be attacked, by treating said surfaces with aqueous solutions of a mercury halide, such as mercuric chloride. However, under the conditions which obtain in an operation intended to bring about dissolution of the aluminum in liquid mercury at elevated temperature and pressure, an aqueous solution cannot be used. The presence of water causes immediate further reaction, due to the electrochemical couple being set up, causing loss of aluminum, contamination with oxide and hydrated oxide, and also evolution of hydrogen with consequent operational hazard. Moreover, where the aluminum containing material to be treated has a spongy texture, water will be trapped flashing to steam and providing serious dangers and losses in the amalgamation procedure.

In accordance with the invention, it was found that these drawbacks are successfully overcome by employing a mercury halide as an activating agent for the surface of the aluminum metal in an anhydrous environment, such as an anhydrous molten carrier salt or mixed salt melt. The carrier salt or salt melt employed should not of itself react with the aluminum in its ordinary state, nor should it react with the aluminum after the oxide film has been penetrated and the aluminum wetted by the mercury or mercury amalgam.

The carrier salt or salt melt employed according to the invention is one having a melting temperature below the boiling temperature of mercury at atmospheric pressure, i.e. below about 357° C., and it must be capable of dissolving and holding in solution at or near its melting point a sufficient concentration of the mercury halide to provide an effective activating action by the latter.

The mercury halide employed as an activator will preferably be a mercuric halide, such as, for example, mercuric chloride or mercuric bromide. The activation involves a displacement reaction: $3HgCl_2 + 2Al = 3Hg + 2AlCl_3$. The mercury liberated by this reaction remains at the places where it is produced, facilitating immediate attack by the extracting mercury in the subsequent leaching operation.

The concentration of mercuric halide to be provided by the molten salt carrier or salt melt should be sufficient to provide a quantity of at least 0.005 gm. of mercuric halide per 100 sq. cm. of aluminum surface to be treated, and preferably between about 0.005 and 0.05 gm. per 100 sq. cm. of exposed aluminum surface. Accordingly the salt carrier or salt melt should have a solubility for mercuric halide ranging up to several percent by weight, so as to be well above the indicated concentration range.

Where a single salt is used as a carrier for the mercury halide, the salt will preferably be an anhydrous halide of aluminum, such as aluminum trichloride or tribromide. Where a salt melt or mixture is employed as a carrier, the mixture may or may not include aluminum trichloride or tribromide, as originally prepared. However, after use for some time in the activation step, the melt will accumulate $AlCl_3$ formed by the displacement reaction with mercuric chloride, and this will tend to combine with the other salt melt components, forming double salts, which may tend gradually to lower the melting point of the salt melt.

In accordance with the preferred embodiment of the process of the invention, the aluminum metal containing material to be extracted is caused to pass through a layer of the molten activating carrier salt or salt melt prior to its initial contact with the hot extracting liquid mercury. For this reason, the temperature of the mercury determines the choice of the salt or salt melt composition, as well as the requisites that the density of the salt melt must be such that it will float on top of the hot mercury, and be capable of dissolving the activating mercury halide at temperatures below the boiling point of mercury.

Although the boiling temperatures of mercuric chloride or mercuric bromide are only slightly above 300° C., their vapor pressure in the dilute solutions contemplated by the invention is suppressed to a considerable extent. Moreover, because the salt melt is positioned on the mercury surface, it is preferable, if normal atmospheric pressure is employed, to operate at a temperature not substantially higher than about 300° C., at the level of contact. However, if higher pressures are used, higher temperatures may be selected. However, in accordance with the invention, it is preferred to operate at normal atmospheric pressure, this being one of the advantages of the process of the invention.

Where the aluminum metal being extracted has normal, uncorroded surfaces, the mercury halide activated salt melts will function effectively to attack the oxide film. However, where thicker oxide films are present, additions of fluorides to the salt melt aid in penetration of the oxide films and in their disruption, thereby accelerating the activation. Suitable fluoride additives for this purpose include, for example, aluminum fluoride $AlF_3$, or the alkali metal fluorides, NaF, KF, LiF and $NH_4F$. Owing to their lesser solubility in the salt melts, the alkaline earth metal fluorides $MgF_2$, $BaF_2$, and $CaF_2$, are less well adapted for this purpose. Cryolite may however, also be successfully employed. The solubility of the alkali metal fluorides and cryolite in most of the contemplated salt mixtures is in the range of 0.2% to 5.0% by weight at temperatures below 360° C., and will be in the range 0.2% to 2% in melts containing more than 50 mols percent of $AlCl_3$, the range depending upon the temperatures between about 100° and 360° C. The lower solubility of the alkaline earth metal fluorides does not diminish their usefulness as additives, however, because the presence of fluorides in large amounts is unnecessary, since their main function is to attack the oxide film, opening up cracks and spots at which the mercury halide may act more readily. Their presence is of importance only if the oxide film is thicker than normal, e.g. in the case of anodized scrap or heavily corroded aluminum. Where the metal is extremely corroded, it may be desirable to employ a pretreatment step, subjecting the metal to etching in aqueous caustic soda solution, followed by rinsing and drying. The amount of fluoride added will be within the percentage ranges previously indicated.

As mentioned previously, the salt carrier may be simply a molten aluminum halide, such as aluminum chloride $AlCl_3$ or aluminum bromide $AlBr_3$, or simply a molten alkali metal halide, such as sodium, potassium, or ammonium chloride or bromide. The solubility of mercuric chloride or mercuric bromide is very high in such melts. Accordingly it is within the scope of the invention to employ binary molten mixtures of mercuric halides with the same halides of alkali metals or aluminum. Examples of such binary mixtures and their melting temperatures are given in Table 1:

TABLE 1

| Mol percent | Mol percent | Melting Points, ° C. |
| --- | --- | --- |
| 90–80 $HgBr_2$ | 10–20 NaBr | 235–290 |
| 90–50 $HgBr_2$ | 10–50 KBr | 220–210 |
| 80–35 $HgBr_2$ | 20–65 $NH_4Br$ | 220–270 |
| 90–10 $HgBr_2$ | 10–90 $AlBr_3$ | 225–100 |
| 90–80 $HgCl_2$ | 10–20 NaCl | 280–310 |
| 85–55 $HgCl_2$ | 15–45 KCl | 275–260 |
| 90–10 $HgCl_2$ | 10–90 $AlCl_3$ | 275–190 |

Even though in some of the listed mixtures the mercuric salt may be the prevalent component, the accumulation of AlCl₃ or AlBr₃ by displacement as a product of the reaction will tend to adjust the balance. It is preferable, however, to confine the concentration of the mercury halide to an amount which is sufficient to accomplish the activation of the aluminum metal without reacting with too much of it. Hence generally, the concentration of mercuric halide in salt melt is selected so as to provide a minimum of 0.005 gram per 100 sq. cm. of aluminum metal surface. If the surface cannot be estimated, the concentration of mercury halide should be at least about 0.25% by weight of the melt, preferably between about 0.5% and about 1% by weight.

In accordance with another aspect of the invention, the concentration of mercuric halide, such as mercuric chloride, may be maintained at the desired level in relation to the surface of the aluminum metal containing material which is being supplied to the system by introducing chlorine gas beneath the surface of the mercury pool underlying the salt melt, thereby forming mercuric chloride in situ.

Another group of salt melts suited as carriers for the activating mercury halide, are binary or complex mixtures of one or more aluminum halides, such as aluminum chloride or bromide, with other metal halides, including double salts. The additional metal halides may include alkali metal halides, such as the chlorides, bromides, fluorides and iodides of sodium, potassium, lithium and ammonium for example NaCl, NaF, KCl, KF, LiCl, LiF, NH₄Cl, NH₄F, NH₄BF₄, and halides of alkaline earth metals such as calcium, barium and magnesium, including CaCl₂, BaCl₂, MgCl₂, and double salts, such as NaAlCl₄, KAlCl₄, LiAlCl₄, and mixtures thereof, and mixtures of such double salts with AlCl₃, or of AlCl₃ with AlBr₃. Additions of fluorides such as NaF or cryolite or KF-NaF-Lif eutectic may be made to combinations of such double salts with AlCl₃, in amounts up to 5%.

It is preferred to select halide salt melts which have a melting point below the boiling point of mercury (357° C.) at normal atmospheric pressure. Phase diagrams of suitable binary mixtures and their melting temperatures may be found for example in the article by Kendall et al., J.A.C.S., vol. 45, pages 977–978 (1923).

Of the salt mixtures which readily dissolve mercuric chloride or bromide at temperatures below the boiling point of mercury (357° C.), those containing more than about 50% by weight of AlCl₃ or AlBr₃, or both, are preferable.

These may be double salts, such as those shown in the following table:

TABLE 2

|  | M.P., °C. |  | M.P., °C. |
| --- | --- | --- | --- |
| AlCl₃·NaCl | 170 | AlBr₃·NaBr | 200 |
| AlCl₃·KCl | 260 | AlBr₃·KBr | 188 |
| AlCl₃·LiCl | 190 | AlBr₃·LiBr | 195 |
| AlCl₃·NH₄Cl | 300 | AlBr₃·NH₄Br | 230 |

However, more complex mixtures of aluminum halides with other salts may also be employed, such as those shown in Table 3.

TABLE 3

[Percent by weight]

| No. | Percent AlCl³ | Percent KCl | Percent NaCl | Percent LiCl | Percent MgCl₂ | Percent BaCl₂ | Melting Points or Intervals, °C. |
| --- | --- | --- | --- | --- | --- | --- | --- |
| 1 | 75 | 25 |  |  |  |  | 159 |
| 2 | 70 | 25 | 5 |  |  |  | 170–70 |
| 3 | 80 | 10 | 10 |  |  |  | 70 |
| 4 | 78 |  |  |  | 22 |  | 155 |
| 5 | 70 | 10 | 20 |  |  |  | 180–70 |
| 6 | 70 |  | 30 |  |  |  | 127 |
| 7¹ | 78 |  |  |  | 22 |  | 207 |
| 8¹ | 73 |  |  |  |  | 27 | 255 |

¹ In mol percent.

The melts in Table 3, for which a single melting temperature is given, are eutectics. All of these melts are readily miscible with each other and remain liquid within a range below 360° C., and all dissolve sufficient mercuric halide to make them suitable carriers for the activation of the aluminum. Another and more complicated salt mixture which can be used at a temperature of 250° C. and higher is one having the composition in percent by weight:

| | Percent |
| --- | --- |
| AlCl₃ | 70.0 |
| AlBr₃ | 2.5 |
| NaCl | 8.0 |
| KCl | 8.0 |
| LiCl | 3.0 |
| McCl₂ | 1.0 |
| BaCl₂ | 1.0 |
| CaCl₂ | 1.0 |
| NH₄Cl | 3.0 |
| NH₄F | .1 |
| NH₄BF₄ | .1 |
| NaBr | 2.0 |
| NaF | .1 |
| AlF₃ | .1 |
| CaF₂ | .1 |
| | 100.0 |

Salt melts which do not contain aluminum halides are also within contemplation of the invention, and are exemplified in Table 4.

TABLE 4

| Mol Percent LiCl | Mol Percent KCl | Mol Percent NaCl | Melting Point, 350° C. |
| --- | --- | --- | --- |
| 57 | 40 | 3 | 350 |
| or |  |  |  |
| 59 | 41 |  | 352 |
| 55 | 43 | ¹2 | 348 |

¹ CaCl₂.

Such melts will not, however, long remain free from AlCl₃, because the latter will be formed from the aluminum metal by displacement with the mercuric chloride, and will combine with the listed salts to form double salts, thereby tending to lower the melting temperatures of these mixtures.

The preferred salt melt of the invention is a mixture of aluminum chloride AlCl₃ and ammonium chloride NH₄Cl which is homogeneously vaporizable at the contemplated extraction temperatures. If a phase diagram for the system AlCl₃–NH₄Cl is constructed from data in the literature (Kendall et al. article, loc. cit.), the system is found to have two eutectics. For compositions containing 80% or more mol percent AlCl₃ there exists a region of liquid plus vapor phase. The entire system, regardless of composition, appears to be vaporizable at a temperature in the range 400° to 500° C. The AlCl$_3$–NH$_4$Cl salt melts which may be advantageously employed as carrier compositions according to the invention are those containing between about 20 and about 65 mol percent of NH$_4$Cl, preferably between about 35 and about 50 mol percent. A melt found to be particularly suitable is that containing 36.9 mol percent of NH$_4$Cl, which is totally vaporized at about 400° C. Such a mixture contains about 19% NH$_4$Cl and 81% AlCl$_3$ by weight, and has a melting point of 229.4° C. However, the choice of a particular mixture will depend upon operating conditions, such as the temperature of the liquid mercury pool on which the melt is situated. Thus, if the mercury temperature is 280° C., a mixture melting at about 260° C. may be chosen, which would correspond to a composition containing either 42 or 57 mol percent of NH$_4$Cl. All these mixtures readily dissolve mercuric chloride in the amounts contemplated by the invention. Since the reaction of the mercuric chloride with the aluminum produces more AlCl$_3$, the melting temperature of a melt initially 57% NH$_4$Cl would tend to rise, perhaps as high as 300° C. during operation and hence would solidify on the surface of the mercury. On the other hand, a melt containing initially 42 mol percent NH$_4$Cl would tend toward a lower melting temperature as the relative concentration of AlCl$_3$ increased during the activation step. Accordingly, the indicated selection of melt would be the one containing 42 mol percent of NH$_4$Cl.

In its broadest aspect, the novel process of the invention includes the steps of introducing an aluminum metal containing material into a substantially stationary body of hot liquid mercury which is in communication with an initial extraction zone comprising a stream of downwardly flowing hot liquid mercury, passing the material through the body of mercury and moving the material through the downwardly flowing mercury stream in the same direction as the mercury flow, passing the material and the mercury through a horizontally disposed main extraction and heating zone in the same direction to form a liquid amalgam of aluminum and mercury, withdrawing said amalgam at a point just preceding the outlet of said main extraction and heating zone, moving the undissolved residue into and through a washing zone comprising a downwardly flowing stream of mercury in a direction countercurrent to the residue flow or movement, and discharging the residue from said washing zone.

The arrangement of these zones is such that the body of the mercury provides a pair of upwardly extending hydrostatic mercury columns whereby the resulting pressure causes the temperature in the system to exhibit a gradient from less than about 360° C. and ordinary atmospheric pressure at the upper portion to substantially above 360° C., i.e. the boiling temperature of mercury, in the lower portions of the body of mercury. Of course, the upper level of mercury may alternatively be kept under the pressure of air or a non-oxidizing gas, if a higher temperature than 360° C. is employed, e.g. 400° C. at the top level with a nitrogen blanket kept at 3 atm. abs. In any case the temperature in the lower portion of the body of mercury is substantially higher, e.g. 450–650° C., the preferred range being 500–550° C. Moreover, the flowing body of mercury is maintained in compartmented contiguous portions, by means of the disc conveyor arrangement described below, the pressure exerted by the hydrostatic columns serving to counteract the vapor pressure of the mercury in each compartmented portion, and allowing the temperature of the mercury to rise as it flows from the initial extraction zone into and through the main extraction and heating zone.

In its preferred form, the invention contemplates a process for the extraction of aluminum metal from aluminum metal containing materials by means of hot liquid mercury, comprising the steps of contacting the exposed surfaces of the aluminum metal with a solution of a mercuric halide in an anhydrous molten salt to promote solution of the aluminum in the mercury, and then extracting the aluminum metal from said material with hot liquid mercury to form an amalgam of aluminum and mercury, and separating said amalgam from the undissolved material. This form of process may be carried out by introducing the aluminum metal containing material into a substantially stationary body of a molten salt or salt mixture containing a mercuric halide, which rests upon the upper surface of a substantially stationary body of hot liquid mercury, and the extraction then completed by means of the passage of the material through initial extraction, main extraction and heating, and washing zones successively as previously described. The aluminum may be separated from the amalgam by distilling off the mercury, in accordance with known procedures. Ordinary aluminum can be refined to a purity of 99.95% Al or better by mercury refining.

The presently preferred embodiment of a suitable apparatus for performing the process of the invention is shown in the accompanying drawings. The extraction system is shown schematically in FIG. 1, and comprises a housing 1 which may take the form of a cylindrical tube, forming a triangle. The housing is erected so as to provide a horizontally disposed leg 2 which constitutes a main extraction and heating zone and which passes through a heating furnace 18 (not shown), the other two legs extending upwardly and at an inclination to provide an initial extraction zone 3, and a washing zone or portion 4. Connected and communicating with leg 3 is a chamber 5 adapted to contain a pool of mercury and the activating molten salt carrier. Chamber 5 connects with leg 3 through portion opening 6 in the bottom thereof. The walls 7 and top 8 of chamber 5 terminate in inlet portion 9, through which material to be treated is introduced, said material being evenly distributed by spreading device 10. The alloy feed is preferably preheated to about the same temperature as the molten salt, in order not to cause solidification of the salt. An inlet pipe 12 is provided leading through the bottom 11 of chamber 5, through which chlorine gas may be passed into the body of mercury therein. Means are also provided for introducing hot mercury into chamber 5 and into extraction leg 3, comprising inlet pipe 13, although auxiliary means for introducing mercury directly into the chamber may be included.

Main extraction and heating portion 2 is provided at its bottom with discharge means 14 for removal of amalgam. Washing leg 4 is provided with an inlet pipe 15 for introducing mercury, as shown. In its upper portion, washing leg 4 is connected to a system 16 for discharging undissolved residues, such system including for example a screw conveyor 17. Disposed within and extending through the three legs of the apparatus is a suitable device for moving the pieces of aluminum containing material to be extracted continuously through the system, designated 19. This conveyor may be of any suitable type, but in the preferred embodiment it is a chain or cable type equipped wtih flights or discs 20, which move the material forward. The conveyor is power driven by driving means shown generally at 21, and moves downward in the extraction (left) leg, and upward in the washing leg.

The level of the body of mercury in the system is maintained as indicated at 22, providing a pair of hydrostatic mercury columns, and the molten salt mixture 23 rests on the upper surface of the body of mercury present in chamber 5.

In operation, the system is filled with mercury which has been preheated to any desired temperature, and introduced at points 15 and 13 to reach level 22. The temperature of the mercury is maintained by heating furnace 18. A molten salt carrier containing a mercuric halide is introduced to rest upon the surface of the pool of mercury in chamber 5. Material to be extracted is fed into the apparatus through inlet 9, and passes downward through the salt melt, the aluminum becoming activated thereby, thence onto the body of mercury in chamber 5 and through opening 6 into the downwardly flowing mercury in leg 3. Chlorine gas may be led into the mercury body to provide additional mercuric chloride for the salt mix, if necessary. In the initial extraction leg 3 the pieces of material (originally about ¼" in diameter) are engaged by the flights or discs and moved downwards. At a point in the extraction leg where the temperature reaches the desired level, the vaporizable molten salt components are volatilized and bubble up to be condensed in the main body of molten salt. The provision of a reflux condenser to avoid salt loss may be desirable. The dissolved aluminum in the form of amalgam is withdrawn at 14, while the undissolved materials are discharged at point 16.

While the preferred embodiment of the apparatus has been disclosed as triangular in shape, it will be understood that this has been done solely for purposes of illustration, and that the invention is not to be considered as limited thereby. Thus, the apparatus may be constructed so as to include substantially vertical legs for initial extraction and washing, with the conveyer system passing over a pair of supporting guides on rolls positioned at the upper portion of the apparatus. Alternatively the two upwardly extending legs can be inclined at any desired angle from the vertical, and either towards or away from each other.

FIGURE 2 shows a preferred construction of the flights or conveyer discs which are perpendicular to the inner walls of the tube 24, and have their edges spaced away from said inner walls by contact points or extensions 27, made of a wear-resistant material, such as tungsten carbide, permitting mercury to flow past the disc, through areas 25. In addition openings located at the inner portion of the disc 26 are provided to permit additional passage of mercury.

The aforesaid conveyer flights or discs perform additional and unique functions in that they provide a series of chambers whereby the body of liquid mercury, and its amalgam content is maintained in compartmented contiguous portions. At each position of the conveyer chambers, and particularly in the upwardly extending legs of the apparatus, the action of the mercury columns upon that particular position provides a balance of temperature and pressure, depending upon the height of the mercury. Moreover, the discs, by virtue of their central and peripheral passage ways described above constrict the flow of the mercury thus increasing its velocity and turbulence. The mercury carries within the body thereof, the aluminum-mercury amalgam which has a lesser density than the mercury, by reason of the volume of aluminum which it contains, and its elevated temperature, and which therefore tends to rise upward in the system. The discs impart to the downwardly flowing mercury, both in the initial extraction leg and in the washing leg, a dynamic action which restricts the upward movement of the amalgam thrusting it toward that portion of the apparatus provided for exit of the amalgam.

The invention may be further illustrated by the following examples, which are not, however, to be regarded as limiting.

*Example 1*

An aluminum-silicon alloy having the approximate composition: 60% Al, 35% Si, 2% Fe, 1.5% Ti, 1% C, and 0.5% oxidic slag, was comminuted into pellets having an average diameter of 2 to 10 mm. The alloy was fed into the apparatus of FIG. 1. The distance from mercury level 22 to the lower horizontal heating leg 2 was approximately 11 meters, designed to counteract the vapor pressure of the mercury, which in the heating zone was maintained at about 500° C. and approximately 14.5 atmospheres pressure. By means of the compartmented conveyor, heat exchange between the liquid mercury in the heating zone 2 and the mercury in chamber 5 is minimized and the mercury in chamber 5 is held at about 270°–300° C. At the upper surface of the mercury 22 in chamber 5, a salt melt was maintained consisting of about 19% by weight of $NH_4Cl$ and 81% $AlCl_3$. The upper level of the salt melt was maintained as shown at 23, the temperature of the salt melt being the same as that of the underlying body of mercury (270°–300° C.). Mercuric chloride was added to the salt melt to achieve a concentration of 0.5% by weight, based on the estimated surface of the aluminum charged.

The activated aluminum was moved toward the extraction zone 3, where it was engaged by discs 20 and moved downwards. At the point in the extraction zone where the temperature reached about 400° C., the adherent salt vaporized completely. The amalgam was withdrawn, and the aluminum recovered by distilling off the mercury therefrom. As aluminum chloride is added to the original salt melt mixture by the activation reaction, the salt melt is removed periodically and its composition adjusted by eliminating excess aluminum chloride, for example by fractional distillation, or by freezing out portions in accordance with phase diagram data. Moreover, as the salt melt thickens by absorption of removed aluminum oxide, it must be removed and purified from time to time.

*Example 2*

An aluminum-silicon alloy containing about 29% Al, 60% Si, 5% Fe and 6% Ti, and representing the spongy residue obtained by separating liquid Al-Si eutectic from a semi-solidified crude Al-Si alloy by filtration, was selected for mercury extraction. During the filtering step, air had entered the holes of the spongy mass and caused formation of an oxide film on the aluminum, hence the Al surface to be treated could not be estimated. The spongy material was crushed to ¼" diameter lumps, and charged into the apparatus employed in Example 1. A salt melt was employed containing 75% $AlCl_3$, 24.5% KCl, and 0.5% cryolite, by weight, to which there was added 0.5% by weight of mercuric chloride. The melting temperature of the mixture was about 160° C. The activation was carried out at 250° C. The salt melt was circulated from the main chamber into another vessel in which its content of $HgCl_2$ was adjusted, while excess $AlCl_3$ formed during activation was removed by distillation. After filtering off oxide sludge accumulations, the salt mixture was circulated back to the main chamber. Non-volatile salt which is carried into the amalgam is subsequently removed from the insoluble leach residue by washing with water and drying.

*Example 3*

To illustrate operating conditions of the apparatus of the invention, with no activation employed, a run approximates the following conditions: The feed material was an alloy having the composition: 60% Al, 35% Si, 2.5% Fe, 1.0% Ti, 1.0% C, 0.5% slag. This was comminuted to pieces 3–10 mm. average diameter. The dimensions of the apparatus were: length of horizontal heating leg (between rising legs) 20 meters; height of legs, between upper and lower mercury levels 14 meters; inside diameter of circular tube 120 mm.; number of compartments provided by conveyer discs 50. Inside diameter of compartment enclosure 116 mm., clearance of disc versus inside tube 2 mm.

The rate of feed of alloy 10 kg. per minute. Mercury charged per minute to dissolve a concentration of 2% Al by weight, 275 kg. (approximately 20 liters at normal temperature). Amount of mercury charged into extraction leg, 15 liters per min. as measured at normal temperature, and into washing leg, 5 liters per minute. Conveyer speed 1 meter per minute. Speed of mercury through clearance spaces parallel to conveyer discs about 9–10 meters per minute. Temperature of upper mercury level (body in chamber 5) 300° C., temperature of mercury flowing downward in extraction leg 300° C., temperature of mercury in heating zone 550° C., pressure approximately 18.5 atmospheres.

Since a function of the mercury added through the input and output legs is to wash out the aluminum-amalgam from the compartments and the insolubles, it is desirable to control the relative quantities of mercury in the two legs. The ratio of 3:1 in the example (of volumes of mercury added through the input versus the output leg) may be changed according to the ease or difficulty in washing aluminum out of residues of different physical shapes, which is influenced by their chemistry. In an alloy of the kind of the example, lower iron content will allow the skeleton of silicon crystals more readily to collapse and even become powder, after the aluminum is extracted, while higher iron content will produce spongy consistency of higher strength, holding better together and therefore being more difficult to wash out. Accordingly, the amount of mercury added to the output leg is variable. The hot mercury aluminum-amalgam as formed tends to float upward owing to its lesser density and to deposit crystals of aluminum in the cooler upper portions of the legs of the apparatus. This tendency may be controlled and reversed in a number of ways, including increasing the downward rate of flow of the mercury in either or both legs, or by adjusting the speed of the conveyer, or by the dynamic action of the conveyer discs which regulate and constrict the flow of the body of mercury and its contained amalgam.

What is claimed is:

1. In the process for the extraction of aluminum metal from an aluminum metal containing material by means of hot liquid mercury and involving the steps of introducing particles of an aluminum metal containing material below its melting point into a body of hot liquid mercury in an initial extraction zone comprising a stream of downwardly flowing hot liquid mercury, moving the material through the downwardly flowing mercury stream and in the same direction as the mercury flow, thence passing the material and the flowing body of mercury through a horizontally disposed main extraction and heating zone in the same direction to form a hot and less dense amalgam of aluminum and mercury, withdrawing said amalgam from said main extraction and heating zone, moving the undissolved residue into and upward through a washing zone comprising a downwardly flowing stream of hot liquid mercury in a direction countercurrent to the movement of residue, and discharging said residue from said washing zone, the improvement which comprises maintaining said flowing body of mercury under a temperature gradient from less than about 360° C. in said initial extraction zone to about 650° C. in said main extraction and heating zone, and maintaining said body of mercury flowing downward both in the extraction and washing zones in compartmented contiguous portions, constricting the flow of the mercury in said zones and amalgam between successive compartmented portions to increase its velocity and turbulence thereby counteracting the buoyancy of the hot and less dense amalgam and preventing its separation from the body of mercury.

2. The process of claim 1 in which the rate of flow of the mercury body between said compartmented portions is maintained at about 9 to 10 meters per minute.

3. Process for the extraction of aluminum metal from an aluminum metal containing material by means of hot liquid mercury which comprises the steps of introducing particles of an aluminum metal containing material below its melting point into a substantially stationary body of hot liquid mercury which is in communication with an initial extraction zone comprising a stream of downwardly flowing hot liquid mercury, moving the material through the body of mercury and moving the material with said downwardly flowing mercury stream and in the same direction as the mercury flow, passing the material and the mercury through a horizontally disposed main extraction and heating zone in the same direction to form a hot and less dense amalgam of aluminum and mercury, withdrawing said amalgam from said main extraction and heating zone at a point just preceding the outlet of said zone, moving the undissolved residue into and upward through a washing zone comprising a downwardly flowing stream of hot liquid mercury in a direction countercurrent to the residue flow, and discharging said residue from said washing zone, while maintaining said flowing body of mercury under a temperature gradient from less than about 360° C. in said initial extraction zone to about 650° C. in said main extraction and heating zone, and while maintaining said body of mercury flowing downward both in the extraction and washing zones in compartmented contiguous portions, constricting the flow of mercury in said zones and amalgam between successive compartmented portions to increase its velocity and turbulence thereby counteracting the buoyancy of the hot and less dense amalgam and preventing its separation from the body of mercury.

4. The process of claim 3 in which the rate of flow of the mercury body between said compartmented portions is maintained at about 9 to 10 meters per minute.

5. Process for the extraction of aluminum metal from an aluminum metal containing material by means of hot liquid mercury which comprises the steps of introducing particles of an aluminum metal containing material below its melting point into a substantially stationary body of a molten salt carrier having a melting point below about 357° C. and containing a mercuric halide to promote solution of the aluminum in the mercury, and thence into a substantially stationary body of hot liquid mercury upon the upper surface of which said body of molten salt carrier is positioned, said body of hot liquid mercury being in communication with an initial extraction zone comprising a stream of downwardly flowing hot liquid mercury, moving the material through the body of molten salt carrier and through the body of mercury and moving the material with said downwardly flowing mercury stream and in the same direction as the mercury flow, passing the material and the mercury through a horizontally disposed main extraction and heating zone in the same direction to form a hot and less dense amalgam of aluminum and mercury, withdrawing said amalgam from said main extraction and heating zone at a point just preceding the outlet of said zone, moving the undissolved residue into and upward through a washing zone comprising a downwardly flowing stream of hot liquid mercury in a direction countercurrent to the residue flow, and discharging said residue from said washing zone, while maintaining said flowing body of mercury under a temperature gradient from less than about 360° C. in said initial extraction zone to about 650° C. in said main extraction and heating zone, and while maintaining said body of mercury flowing downward both in the extraction and washing zones in compartmented contiguous portions, constricting the flow of mercury and amalgam between successive compartmented portions to increase its velocity and turbulence thereby counteracting the buoyancy of the hot and less dense amalgam and preventing its separation from the body of mercury.

6. Process for the extraction of aluminum metal from an aluminum metal containing material by means of hot liquid mercury which comprises the steps of introducing an aluminum metal containing a material into a substantially stationary body of a molten salt carrier having a melting point below about 357° C. and containing a mercuric halide to promote solution of the aluminum in the mercury, said carrier resting upon the upper surface of substantially stationary body of hot liquid mercury which is in communication with an initial extraction zone comprising a stream of downwardly flowing hot liquid mercury, moving the material successively through the body of molten salt carrier and the body of mercury and moving the material through said downwardly flowing mercury stream and in the same direction as the mercury flow, passing the material and the mercury through a horizontally disposed main extraction and heating zone in the same direction to form an amalgam of aluminum and mercury, withdrawing said amalgam from said main extraction and heating zone at a point just preceding the outlet thereof, moving the undissolved residue into and upward through a washing zone comprising a downwardly flowing stream of hot liquid mercury in a direction countercurrent to the residue flow, and discharging said residue from said washing zone.

7. The process of claim 6 in which mercuric chloride is formed in situ by introducing chlorine gas into the body of mercury beneath the body of the molten salt.

8. Process for the extraction of aluminum metal from an aluminum metal containing material by means of hot liquid mercury which comprises the steps of contacting exposed surfaces of said aluminum metal with a solution of a mercuric halide in a molten salt carrier having a melting point below about 357° C. to promote solution of the aluminum in the mercury, extracting the aluminum metal from said material with hot liquid mercury to form an amalgam of aluminum and mercury, and separating said amalgam from undissolved material.

9. The process of claim 8 in which the mercuric halide is mercuric chloride.

10. The process of claim 8 in which the mercuric halide content of the molten salt carrier is at least 0.25% by weight.

11. The process of claim 8 in which the concentration of mercuric halide in the salt carrier is at least 0.005 grams per 100 sq. cm. of aluminum metal surface.

12. Process for the extraction of aluminum metal from an aluminum metal containing material by means of hot liquid mercury which comprises the steps of contacting the exposed surface of said aluminum metal with a solution of a mercuric halide, in a molten salt carrier having a melting point below about 357° C. comprising an aluminum halide, to promote solution of the aluminum in the mercury, extracting the aluminum metal from said material with hot liquid mercury to form an amalgam of aluminum and mercury, and separating said amalgam from undissolved material.

13. Process for the extraction of aluminum metal from an aluminum metal containing material by means of hot liquid mercury which comprises the steps of contacting the exposed surfaces of said aluminum metal with a solution of a mercuric halide in a molten salt carrier having a melting point below about 357° C. including an addition of a fluoride, to promote solution of the aluminum in the mercury, extracting the aluminum from said material with hot liquid mercury to form an amalgam of aluminum and mercury, and separating said amalgam from undissolved material.

14. Process for the extraction of aluminum metal from an aluminum metal containing material by means of hot liquid mercury which comprises the steps of contacting the exposed surfaces of said aluminum metal with a solution of a mercuric halide in a molten salt carrier having a melting point below about 357° C. comprising a mixture of an aluminum halide with at least one other metal halide selected from the group consisting of alkali metal, alkaline earth metal, and aluminum-alkali metal double halides, to promote solution of the aluminum in the mercury, extracting the aluminum from said material with hot liquid mercury to form an amalgam of aluminum and mercury, and separating said amalgam from undissolved material.

15. Process for the extraction of aluminum metal from an aluminum metal containing material by means of hot liquid mercury which comprises the steps of contacting the exposed surfaces of said aluminum metal with a solution of mercuric chloride in a molten mixture of aluminum trichloride and ammonium chloride, said mixture containing between about 20 and about 65 mol percent of ammonium chloride, extracting the aluminum from said material with hot liquid mercury to form an amalgam of aluminum and mercury, and separating said amalgam from undissolved material.

16. Apparatus for the extraction of aluminum metal from aluminum metal containing materials by means of liquid metal extractants comprising a continuous tubular member including a generally horizontal bottom section providing a main extraction and heating portion, and connected to an in communication therewith, a pair of upwardly and inwardly extending connected legs providing an initial extraction portion and a washing portion respectively; a chamber adapted to contain a body of liquid metal extractant connected and communicating with said initial extraction portion as its upper end; means for feeding material to be extracted into said chamber; means for supplying liquid metal extractants to said initial extracting and washing portions; continuous conveyor means positioned within said tubular member extending through each portion of the apparatus and adapted to move material to be extracted and extractant metal through the apparatus; means for removing liquid metal extractant containing aluminum; and means for removing undissolved residue located near the top of said washing portion.

17. The apparatus of claim 16 in which said conveyor includes a plurality of spaced discs adapted to provide compartments to move material being treated and extractant metal.

18. The apparatus of claim 17 in which said discs are indented and perforated to provide for passage of liquid extractant metal.

19. The apparatus of claim 16 which includes means for heating said horizontally disposed section.

20. The apparatus of claim 16 which includes means for supplying a gas to said chamber.

21. The apparatus of claim 16 in which the tubular member has said bottom and leg portions connected in a triangular configuration.

22. The apparatus of claim 17 which includes means for controlling the movement of said spaced discs to thrust the liquid metal extractant containing aluminum toward the means for removing same.

References Cited by the Examiner

UNITED STATES PATENTS

| | | | |
|---|---|---|---|
| 550,035 | 11/1895 | Wheeler | 23—270 |
| 1,480,060 | 1/1924 | Greenawalt | 266—12 |
| 2,273,557 | 2/1942 | Bonotto | 23—270 |
| 2,545,938 | 3/1951 | Bilbe | 23—270 |
| 2,614,911 | 10/1952 | Bonotto | 23—270 |
| 2,676,358 | 4/1954 | Messner | 75—68 |
| 2,707,678 | 5/1955 | Messner | 75—68 |
| 2,731,149 | 1/1956 | Findlay | 23—270 |
| 3,043,678 | 7/1962 | Lowry | 75—68 |
| 3,102,805 | 9/1963 | Messner | 75—68 |

FOREIGN PATENTS

| | | |
|---|---|---|
| 226,217 | 1/1960 | Australia. |
| 557,861 | 5/1958 | Canada. |
| 671,054 | 4/1952 | Great Britain. |

DAVID L. RECK, *Primary Examiner.*

WINSTON A. DOUGLAS, BENJAMIN HENKIN,
*Examiners.*